United States Patent
Gill

[19]

[11] Patent Number: 6,122,150
[45] Date of Patent: Sep. 19, 2000

[54] ANTIPARALLEL (AP) PINNED SPIN VALVE SENSOR WITH GIANT MAGNETORESISTIVE (GMR) ENHANCING LAYER

[75] Inventor: Hardayal Singh Gill, Portola Valley, Calif.

[73] Assignee: International Business Machines Corporation, Armonk, N.Y.

[21] Appl. No.: 09/188,834

[22] Filed: Nov. 9, 1998

[51] Int. Cl.[7] .................................................. G11B 5/30
[52] U.S. Cl. ...................................................... 360/324.11
[58] Field of Search .............................. 360/113, 324.11

[56] References Cited

U.S. PATENT DOCUMENTS

| | | | |
|---|---|---|---|
| 5,701,223 | 12/1997 | Fontana | 360/113 |
| 5,958,611 | 9/1999 | Ohta | 360/113 |

*Primary Examiner*—A. J. Heinz
*Attorney, Agent, or Firm*—Gray Cary Ware & Freidenrich LLP; Ervin F. Johnston

[57] ABSTRACT

The present invention is an external field stabilized and near zero magnetostrictive double spin valve sensor with giant magnetoresistive (GMR) enhancing, antiparallel pinned and sense current field pinned layers. In a preferred embodiment of the invention the AP pinned layer has first and second films that are made of cobalt iron ($Co_{90}Fe_{10}$). In order to enhance the spin dependent scattering first and second GMR enhancing layers are employed which are also constructed of cobalt iron ($Co_{90}Fe_{90}$). Further, in order to double the spin valve effect a sense current field (SCF) pinned layer is employed which is pinned in the same direction as the second film of the AP pinned layer. The SCF pinned layer is also constructed of cobalt iron ($Co_{90}Fe_{10}$). In the preferred embodiment all of the magnetic layers are constructed of cobalt iron ($Co_{90}Fe_{10}$) so that their magnetic moments are returned to their original positions after the occurrence of an external field. Further, the cobalt iron ($Co_{90}Fe_{10}$) has near zero magnetostriction so that stress induced anisotropy does not alter the magnetic properties of these layers. The high resistance of cobalt iron ($Co_{90}Fe_{10}$) in the AP pinned layer and the SCF pinned layer ensures that a minimum amount of sense current field is shunted.

26 Claims, 13 Drawing Sheets

(ABS)

(ABS)

(ABS)

(ABS)

(ABS)

(ABS)

(ABS)

ANTIPARALLEL (AP) PINNED SPIN VALVE SENSOR WITH GIANT MAGNETORESISTIVE (GMR) ENHANCING LAYER

BACKGROUND OF THE INVENTION

1. Field of the Invention

The present invention relates to an external field stabilized and near zero magnetostrictive double spin valve sensor with giant magnetoresistive (GMR) enhancing, antiparallel pinned and sense current field pinned layers and more particularly to the combination of the aforementioned layers wherein the layers have low coercivity, near zero stress induced anisotropy and high resistivity.

2. Description of the Related Art

The heart of a computer is an assembly that is referred to as a magnetic disk drive. The magnetic disk drive includes a rotating magnetic disk, write and read heads that are suspended by a suspension arm above the rotating disk and an actuator that swings the suspension arm to place the read and write heads over selected circular tracks on the rotating disk. The read and write heads are directly mounted on a slider that has an air bearing surface (ABS). The suspension arm biases the slider into contact with the surface of the disk when the disk is not rotating but, when the disk rotates, air is swirled by the rotating disk adjacent the ABS to cause the slider to ride on an air bearing a slight distance from the surface of the rotating disk. When the slider rides on the air bearing the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a nonmagnetic gap layer at an air bearing surface (ABS) of the write head. The pole piece layers are connected at a back gap. Current conducted to the coil layer induces a magnetic field into the pole pieces that fringes across the gap between the pole pieces at the ABS. The fringe field or the lack thereof writes information in tracks on moving media, such as in circular tracks on a rotating disk.

In recent read heads a spin valve sensor is employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer, and a free layer. First and second leads are connected to the spin valve sensor for conducting a sense current therethrough. The magnetization of the pinned layer is pinned perpendicular to an air bearing surface (ABS) of the head and the magnetic moment of the free layer is located parallel to the ABS but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with the pinned and free layers. When the magnetizations of the pinned and free layers are parallel with respect to one another, scattering is minimal and when the magnetizations of the pinned and free layers are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor resistance changes cause potential changes that are detected and processed as playback signals by the processing circuitry.

A spin valve sensor is characterized by a magnetoresistive (MR) coefficient that is substantially higher than the MR coefficient of an anisotropic magnetoresistive (AMR) sensor. MR coefficient is dr/R were dr is the change in resistance of the spin valve sensor and R is the resistance of the spin valve sensor before the change. A spin valve sensor is sometimes referred to as a giant magnetoresistive (GMR) sensor. When a spin valve sensor employs a single pinned layer it is referred to as a simple spin valve. A spin valve is also know as a top or bottom spin valve depending upon whether the pinning layer is at the top (formed after the free layer) or at the bottom (formed before the free layer). A pinning layer in a bottom spin valve is typically made of nickel oxide (NiO).

Another type of spin valve sensor is an antiparallel (AP) spin valve sensor. The AP pinned spin valve sensor differs from the simple spin valve sensor, described above, in that the pinned layer of the AP pinned spin valve sensor comprises multiple thin films, which are collectively referred to as an antiparallel (AP) pinned layer. The AP pinned layer has an AP coupling film sandwiched between first and second ferromagnetic thin films. The first ferromagnetic thin film has its magnetic moment oriented in a first direction by exchange coupling to the antiferromagnetic pinning layer. The second ferromagnetic thin film is immediately adjacent to the free layer and is exchange coupled to the first thin film because of the minimal thickness (in the order of 8 Å) of the AP coupling film between the first and second ferromagnetic thin films. The magnetic moment of the second ferromagnetic thin film is oriented in a second direction that is antiparallel to the direction of the magnetic moment of the first ferromagnetic film.

The AP pinned layer is preferred over the single layer pinned layer. The magnetic moments of the first and second films of the AP pinned layer subtractively combine to provide a net pinning moment of the AP pinned layer if any. The direction of the net moment is determined by the thicker of the first and second thin films. The thicknesses of the first and second thin films are chosen to reduce the net moment. A reduced net moment equates to a reduced demagnetization (demag) field from the AP pinned layer. Since the antiferromagnetic exchange coupling is inversely proportional to the net pinning moment, this increases exchange coupling between the first ferromagnetic film of the AP pinned layer and the pinning layer. The high exchange coupling promotes higher thermal stability of the head. When the head encounters elevated thermal conditions caused by electrostatic discharge (ESD) from an object or person, or by contacting an asperity on a magnetic disk, the blocking temperature (temperature at which magnetic spins of the layer can be easily moved by an applied magnetic field) of the antiferromagnetic layer can be exceeded, resulting in disorientation of its magnetic spins. The magnetic moment of the pinned layer is then no longer pinned in the desired direction. A reduced demag field also reduces the demag field imposed on the free layer which promotes a symmetry of the read signal. The AP pinned spin valve sensor is described in commonly assigned U.S. Pat. No. 5,465,185 to Heim and Parkin which is incorporated by reference herein.

The first and second ferromagnetic films of the AP pinned spin valve sensor are typically made of cobalt (Co). Unfortunately, cobalt has high coercivity, high magnetostriction and low resistance. When the first and second ferromagnetic films are formed they are sputtered deposited in the presence of a magnetic field that is oriented perpendicular to the ABS which sets the easy axis (e.a.) of the ferromagnetic films perpendicular to the ABS. During operation of the head the AP pinned layer is subjected to external magnetic fields that have components parallel to the ABS, such as components of the write field. These external fields can cause the magnetic moments of the ferromagnetic layers to switch from one direction perpendicular to an opposite direction perpendicular to the ABS. If the coercivity of the ferromagnetic films of the AP pinned layer is higher than the exchange coupling between the AP pinned layer and the pinning layer the exchange coupling will not bring the magnetic moment of the ferromagnetic layers back to their original direction. This ruins the read head.

Cobalt (Co) has a high negative magnetostriction. The negative sign determines the direction of any stress induced anisotropy. When a magnetic head is lapped, which is a grinding process to form the ABS, nonuniform compressive stresses occur in the layers of the sensor. Because of the magnetostriction and the stresses, the cobalt (Co) ferromagnetic films acquire a stress induced anisotropy that is parallel to the ABS. This is the wrong direction. The stress induced anisotropy may rotate the magnetic moment of the first and second ferromagnetic layers of the AP pinned layer to some extent from perpendicular to the ABS in spite of the exchange coupling field tending to maintain the perpendicular position. This condition causes significant read signal asymmetry. The low resistance of the cobalt (Co) films of the AP pinned layer causes a portion of the sense current to be shunted past the free and spacer layers. This causes a loss of read signal.

Efforts continue to increase the spin valve effect of GMR heads. An increase in the spin valve effect equates to higher bit density (bits/square inch of the rotating magnetic disk) read by the read head. Promoting read signal symmetry is also a consideration. This is accomplished by reducing the magnetic influences on the free layer. A search still continues to lower the coercivity, substantially eliminate magnetostriction and increase the resistance of some of the critical layers of the spin valve sensor.

SUMMARY OF THE INVENTION

I have replaced the first and second cobalt films of the AP pinned layer with first and second cobalt iron ($Co_{90}Fe_{10}$) films. The cobalt ($Co_{90}Fe_{10}$) films have low coercivity, near zero magnetostriction and high resistance. The coercivity is lower than the exchange coupling between the AP pinned layer and the pinning layer so that if the magnetic moments of the cobalt ($Co_{90}Fe_{10}$) films are switched in their directions by an external field the exchange coupling between the AP pinned layer and the pinning layer will return the magnetic moments to their original positions. The near zero magnetostriction means that the stress acquired by the cobalt ($Co_{90}Fe_{10}$) films after lapping the magnetic head will not cause a stress induced anisotropy field. This is because any stress induced anisotropy field is a product of magnetostriction and the induced stress. The high resistance of the cobalt ($Co_{90}Fe_{10}$) films minimizes shunting of the sense current thereby increasing the read signal.

I have also provided a cobalt iron ($Co_{90}Fe_{10}$) pinned layer that is pinned by sense current fields from other conductive layers in the sensor and is referred to hereinafter as a sense current field (SCF) pinned layer. The SCF pinned layer is located on an opposite side of the free layer from the AP pinned layer and is separated from the free layer by a second nonmagnetic electrically conductive spacer layer. The magnetic moment should be directed perpendicular to the ABS antiparallel to the magnetic spins of the pinning layer. The sense current field is directed in a direction that causes this relationship. The cobalt ($Co_{90}Fe_{10}$) SCF pinned layer has a coercivity that is less than the sense current fields so that the sense current fields control the direction of the magnetic moment of the SCF pinning layer instead of external fields tending to rotate the magnetic moment. The near zero magnetostriction eliminates stress induced anisotropy from rotating the magnetic moment from the perpendicular position. The high resistance prevents shunting of the sense current which increases the read signal.

Further, I have provided a free layer that has a nickel iron (NiFe) free film sandwiched between first and second cobalt iron ($Co_{90}Fe_{10}$) free films. The first and second cobalt iron ($Co_{90}Fe_{10}$) films, which are on the order of 10 A thick, interface the first and second spacer layers respectively. Compared to the typical interface of a nickel iron (NiFe) film with a spacer layer each of the cobalt iron ($Co_{90}Fe_{10}$) free film provide a significantly improved spin dependent scattering at its interface with the respective spacer layer. When the sense current is on with no magnetic incursions from a rotating disk (quiescent state of read head) the magnetic moment of the nickel iron (NiFe) and each of the cobalt iron ($Co_{90}Fe_{10}$) free films should be oriented parallel to the ABS. This is accomplished by proper balancing of the fields imposed on the free layer. Cobalt iron ($Co_{90}Fe_{10}$) is a softer magnetic material, in the order of 100 oersteds (Oe), than cobalt (Co). Accordingly, its magnetic moment is more easily rotated by magnetic incursions from the rotating disk making the free layer more sensitive to the read signal. Further, because of the near zero magnetostriction of cobalt iron ($Co_{90}Fe_{10}$) the free layer has near zero stress induced anisotropy so that biasing by hard biasing layers adjacent the side edges of the sensor can effectively stabilize the magnetic domains of the sensor. While the cobalt iron ($Co_{90}Fe_{10}$) layer adjacent the free films has a higher resistance than cobalt (Co) the much thicker nickel iron (NiFe) free film, in the order of 70 A, conducts sufficient current for the sensing. The cobalt iron ($Co_{90}Fe_{10}$) free films are GMR enhancing layers.

An object of the present invention is to provide an external field stabilized and near zero magnetostrictive double spin valve sensor with giant magnetoresistive (GMR) enhancing, antiparallel pinned and sense current field pinned layers.

Another object is to provide dual pinned layers and dual GMR enhancing layers for a bottom antiparallel (AP) pinned spin valve sensor that have low coercivity, near zero stress induced anisotropy and high resistivity.

A further object is to provide a antiparallel (AP) pinned bottom spin valve sensor with a second pinned layer and dual GMR enhancing layers that after lapping has magnetic stability upon the occurrence of external magnetic fields.

Still another object is to provide a magnetic disk drive that incorporates a magnetic head having any of the spin valve sensors in the objects hereinabove and that provides a sense current field that properly orients a magnetic moment of a second pinned layer of the sensor.

BRIEF DESCRIPTION OF THE DRAWINGS

Other objects and advantages of the invention will become apparent upon reading the following description taken together with the accompanying drawings.

DESCRIPTION OF THE PREFERRED EMBODIMENTS

Magnetic Disk Drive

Figure 1:
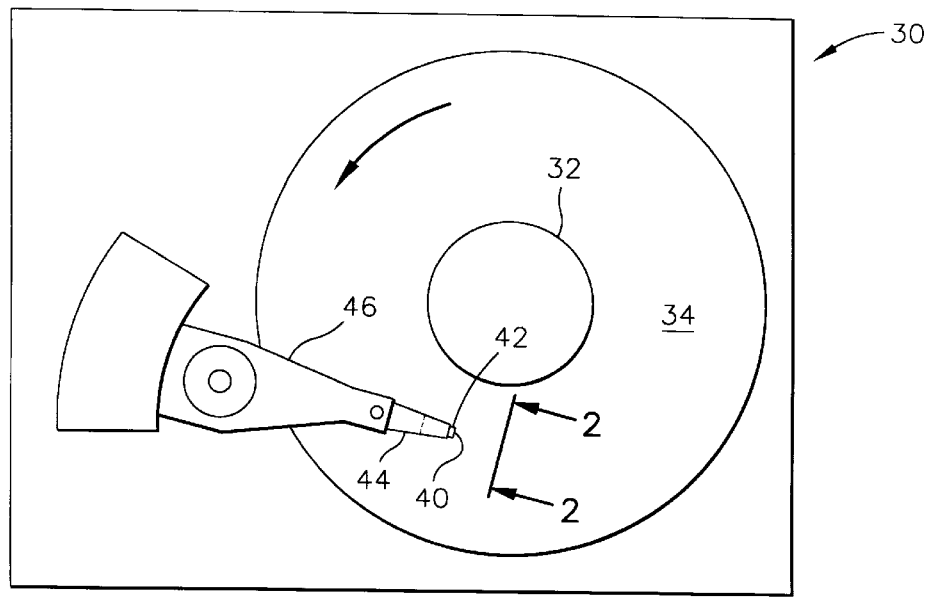
FIG. 1 is a planar view of an exemplary magnetic disk drive.
Figure 2:
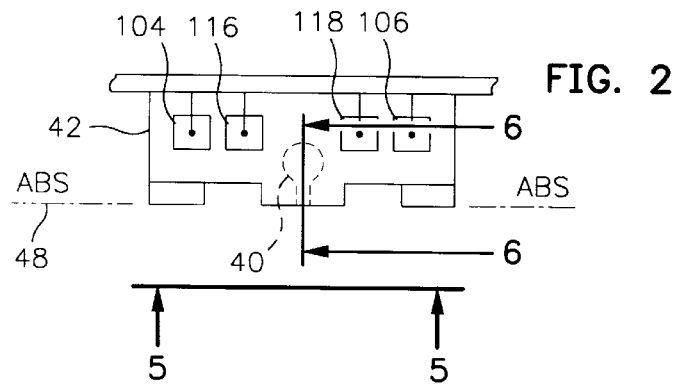
FIG. 2 is an end view of a slider with a magnetic head of the disk drive as seen in plane 2—2.
Figure 3:
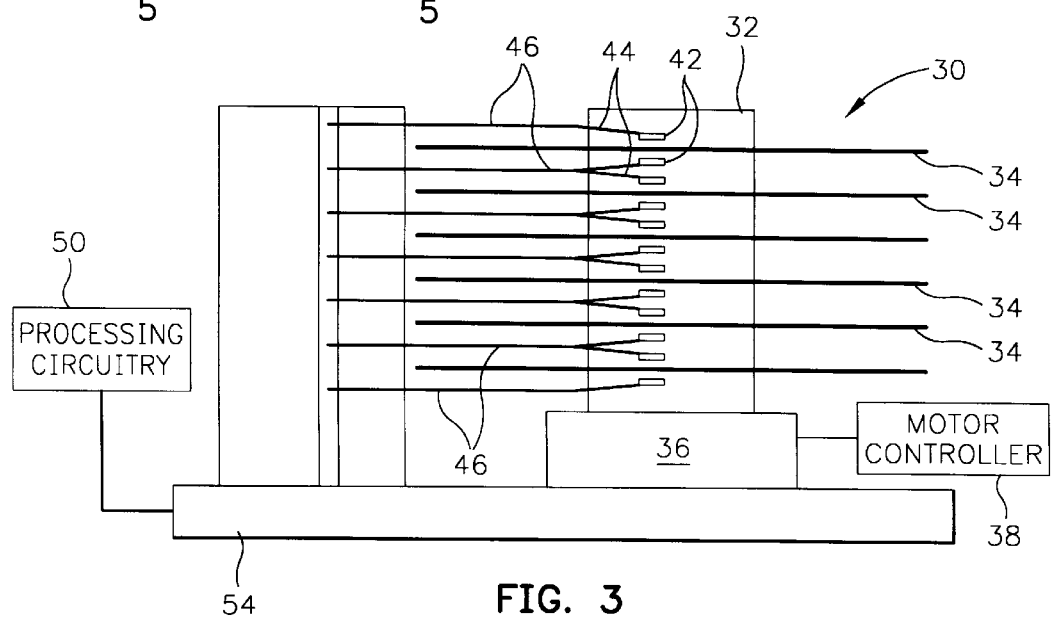
FIG. 3 is an elevation view of the magnetic disk drive wherein multiple disks and magnetic heads are employed.
Figure 4:
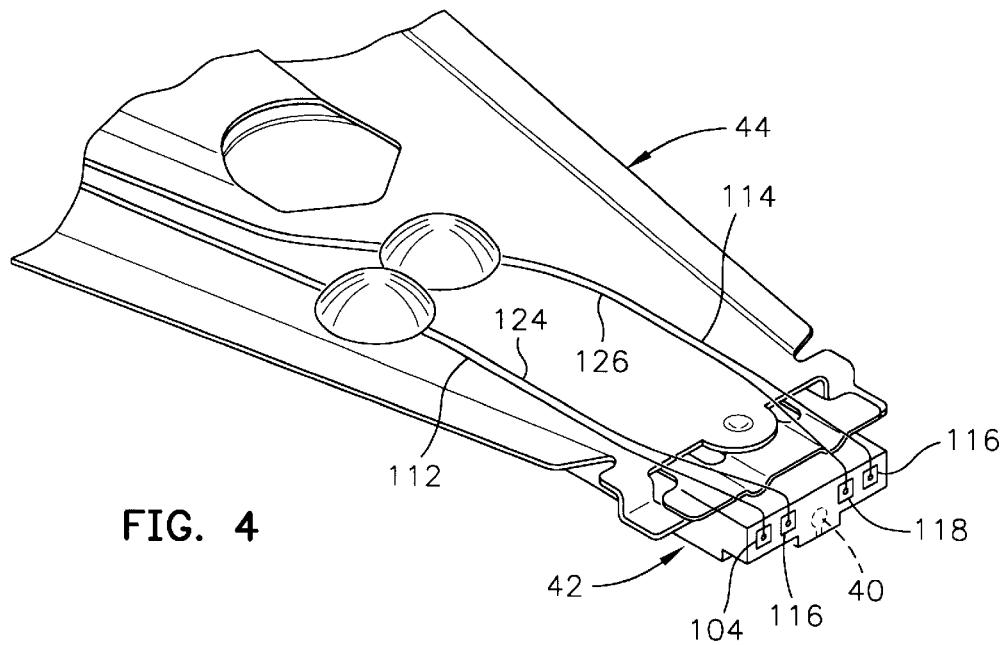
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a motor 36 that is controlled by a motor controller 38. A combined read and write magnetic head 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various tracks. In FIG. 4 the slider 42 is shown mounted to a suspension 44. The components described hereinabove may be mounted on a frame 54 of a housing, as shown in FIG. 3.

Figure 5:
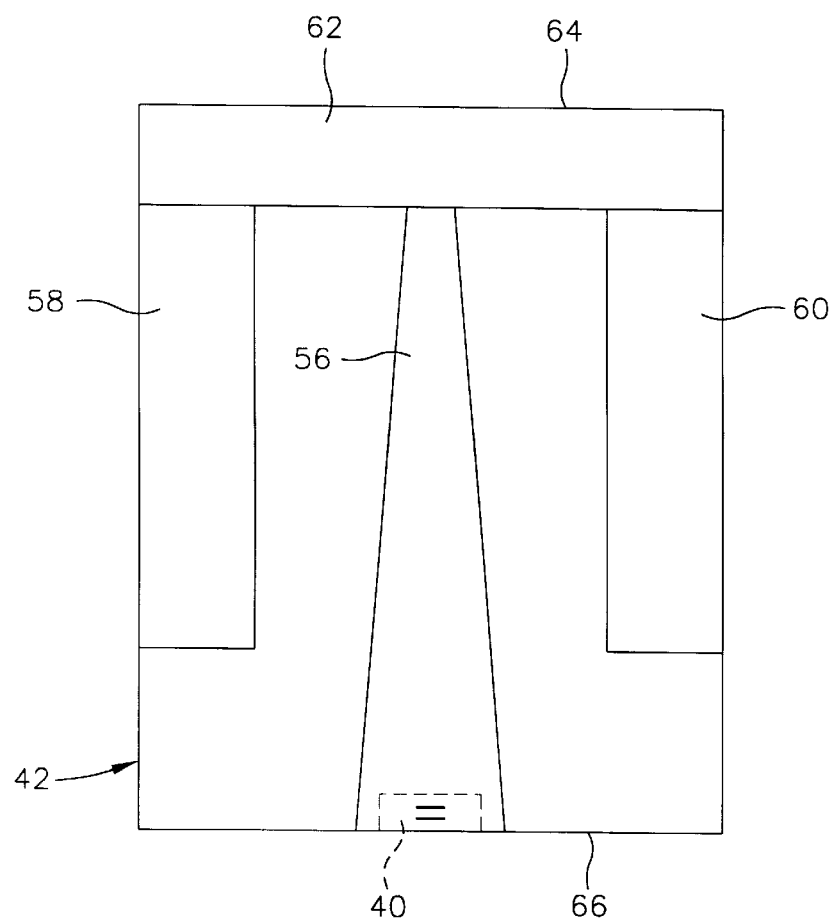
FIG. 5 is an ABS view of the magnetic head taken along in plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
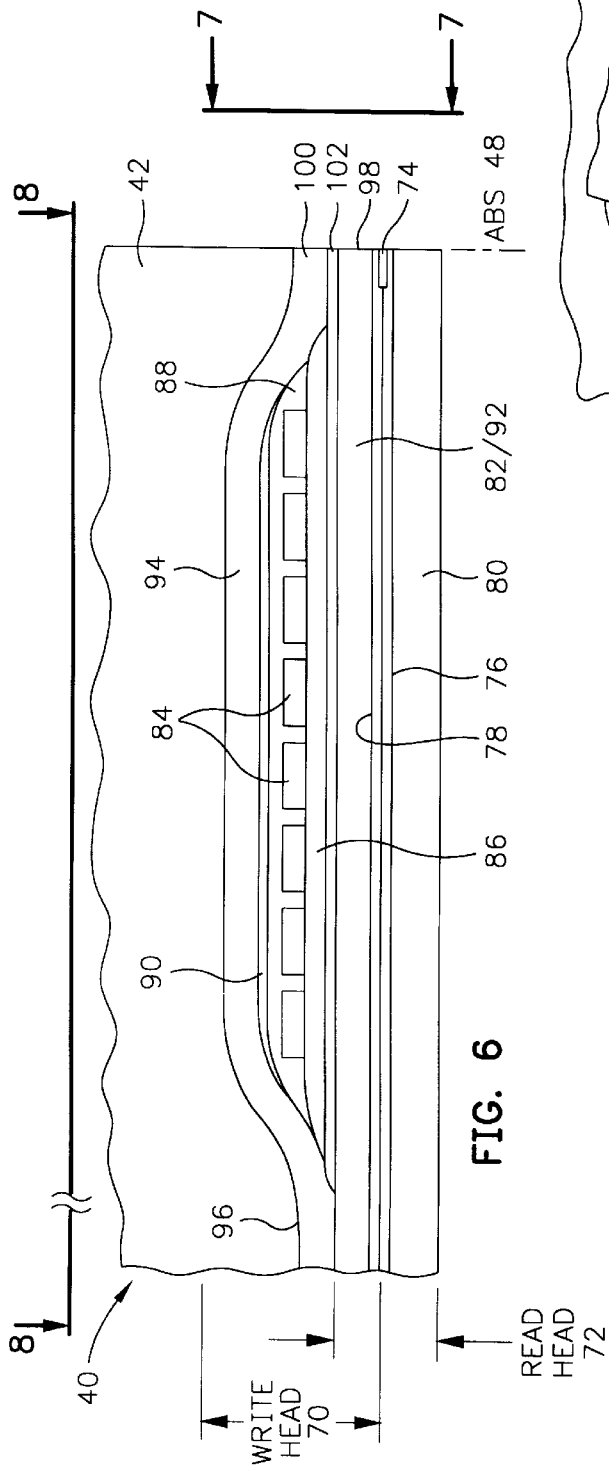
FIG. 6 is a partial view of the slider and magnetic head as seen in plane 6—6 of FIG. 2.
Figure 7:
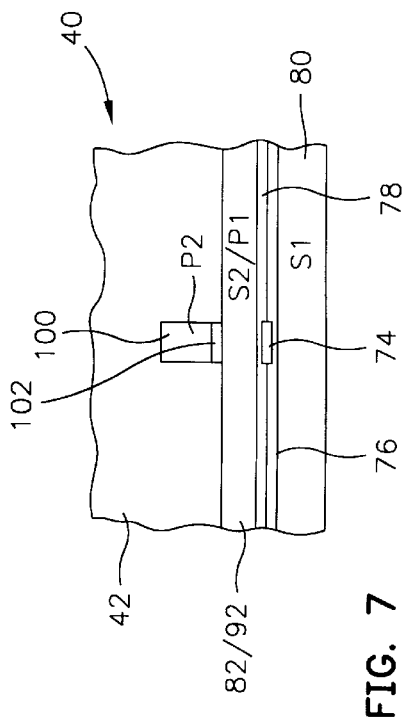
FIG. 7 is a partial ABS view of the slider taken along plane 7—7 of FIG. 6 to show the read and write elements of the magnetic head.

FIG. 6 is a side cross-sectional elevation view of the merged MR head 40, which includes a write head portion 70 and a read head portion 72, the read head portion employing an AP pinned spin valve sensor 74 of the present invention. FIG. 7 is an ABS view of FIG. 6. The spin valve sensor 74 is sandwiched between first and second gap layers 76 and 78, and the gap layers are sandwiched between first and second shield layers 80 and 82. In response to external magnetic fields, the resistance of the spin valve sensor 74 changes. A sense current $I_s$ conducted through the sensor causes these resistance changes to be manifested as potential changes. These potential changes are then processed as readback signals by the processing circuitry 50 shown in FIG. 3.

Figure 8:
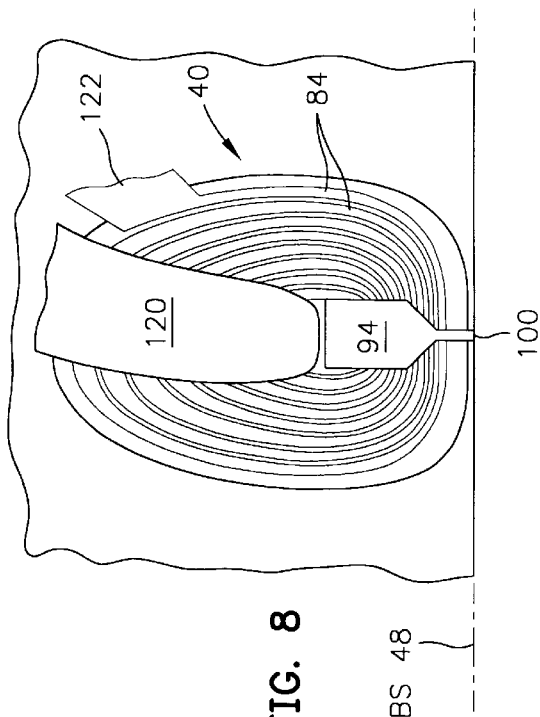
FIG. 8 is a view taken along plane 8—8 of FIG. 6 with all material above the second pole piece removed.

The write head portion 70 of the merged MR head includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

Figure 9:
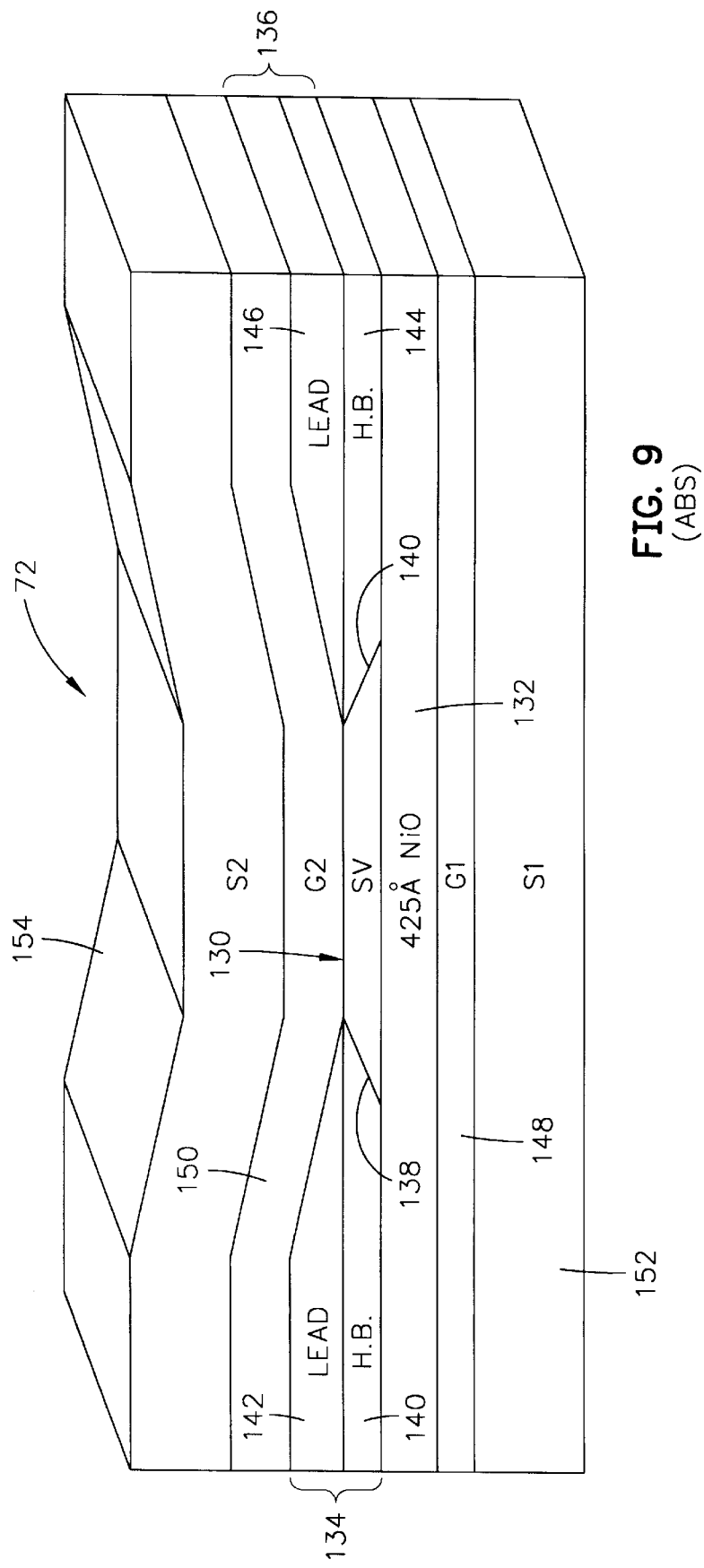
FIG. 9 is an isometric ABS illustration of a read head which employs a spin valve (SV) sensor.

FIG. 9 is an isometric ABS illustration of the read head 72 shown in FIG. 6. The read head 72 has a spin valve sensor 130 which is located on an antiferromagnetic (AFM) pinning layer 132. The spin valve 130 has a pinned layer, to be described hereinafter, that has its magnetic moment pinned by the magnetic spins of the pinning layer 132. The AFM pinning layer may be 425 Å of nickel oxide (NiO). First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037 which is incorporated by reference herein. The first hard bias and lead layers 134 include a first hard bias layer 140 and a first lead layer 142 and the second hard bias and lead layers 136 include a hard bias layer 144 and a lead layer 146. The hard bias layers 140 and 144 cause magnetic fields to extend longitudinally through the spin valve sensor 130 for stabilizing the magnetic domains therein. The AFM pinning layer 132, the spin valve sensor 130 and the first and second hard bias and lead layers 134 and 136 are located between nonmagnetic electrically insulative first and second gap layers 148 and 150. The first and second gap layers 148 and 150 are, in turn, located between first and second shield layers 152 and 154.

It is important that the magnetic layers of the spin valve be magnetically stable to external magnetic fields tending to rotate or switch the magnetic moment of the magnetic layers. Further, it is important that the magnetic layers have low or near zero magnetostriction so that after lapping the head to provide the air bearing surface, as seen in FIG. 9, stresses acquired by the various magnetic layers do not result in stress induced anisotropy fields which rotate their magnetic moments from their set directions. With regard to most of the magnetic layers it is important that they do not shunt the sense current which shunting results in a reduction of the read signal. Following are various examples of spin valve sensors wherein preferred thicknesses are given for illustration purposes. These thicknesses can vary and for each layer the preferred range of thicknesses will be provided hereinafter.

Figure 10:
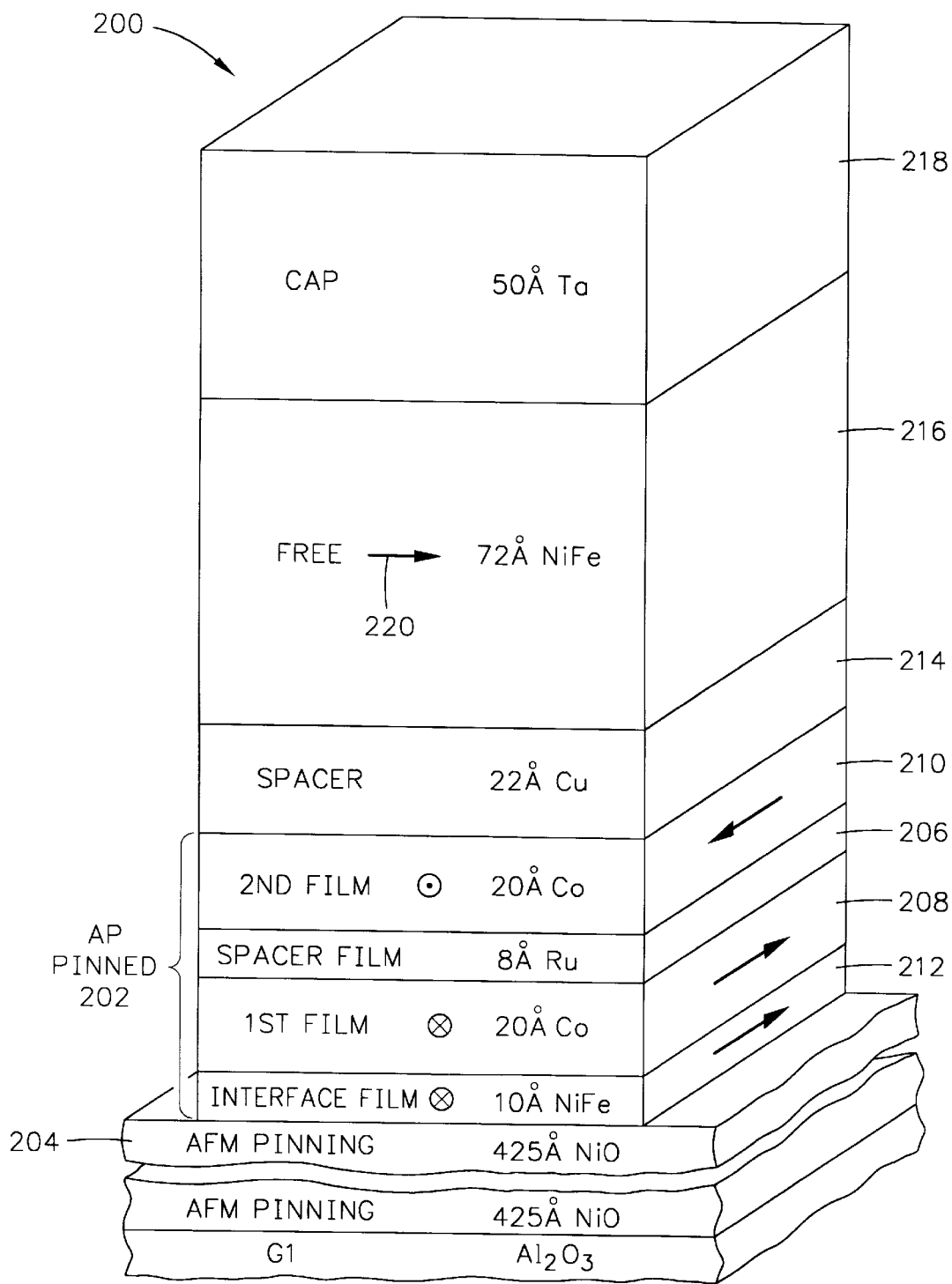
FIG. 10 is an isometric ABS illustration of an AP pinned spin valve sensor.

FIG. 10 is an isometric ABS illustration of a spin valve sensor investigated for its magnetic stability, stress induced anisotropy and shunting of the sense current field. The spin valve sensor 200 is an antiparallel (AP) pinned bottom spin valve. It is an AP pinned spin valve because it has an AP pinned layer 202 and it is a bottom spin valve because the AP pinned layer 202 is pinned at the bottom of the spin valve by the antiferromagnetic (AFM) pinning layer 204. The AP pinned layer 202 includes an AP coupling film 206 which is sandwiched between first and second ferromagnetic films 208 and 210. The AP coupling film may be 8 Å of ruthenium (Ru), iridium (Ir) or rhodium (Rh) and each of the first and second films 208 and 210 may be 20 Å of cobalt (Co). An interface, which may be 10 Å of nickel iron (NiFe), is exchange coupled to the AFM pinning layer 204. It has been found that nickel iron (NiFe) makes a better exchange coupling with the nickel oxide (NiO) AFM pinning layer 204 than the first film 208 of cobalt (Co). A spacer layer 214 is located on the AP pinned layer 202, a free layer 216 is located on the spacer layer and a cap layer 218 is located on the free layer. The spacer layer may be 22 Å of copper (Cu), the free layer may be 72 Å of nickel iron (NiFe) and the cap layer may be 50 Å of tantalum (Ta). Assuming that the magnetic moment of the interface film 212 is pinned into the paper by the AFM pinning layer 204, the magnetic moment of the first film 208 will also be pinned into the paper, as shown by the circles with an x ($\otimes$). The first film 208 is exchange coupled to the second film 210, however, because of the thin AP coupling film 206 therebetween the magnetic moment of the second film 210 is antiparallel to the magnetic moment of the first film 208 and is directed out of the paper, as shown by the circle with a dot therein ($\odot$). The magnetic moment of the free layer 220 is established parallel to the ABS by various magnetic influences of the other layers in the spin valve sensor as well as sense current fields from the conducting layers of the sensor. This magnetic moment is shown at 220 and may be directed either to the right or to the left as desired.

When the read head is flying above a magnetic disk, magnetic incursions from the magnetic disk rotate the magnetic moment 220 of the free layer upwardly or downwardly, depending upon the polarity of the magnetic incursion, causing a relative rotation between the directions of the magnetic moment 220 and the magnetic moment of the second film 210. This relative rotation causes corresponding conduction electron scattering at the interface of the spacer and second film layers 214 and 210 which changes the resistance of the sensor by cos θ. A change in potential due to resistance changes as the sense current is conducted is processed by process circuitry 50 in FIG. 3 for providing a read signal. I have found that the cobalt (Co) first and second films 208 and 210 exhibit high coercivity, stress induced anisotropy and low resistance. The high coercivity is close to the exchange coupled field which poses the risk of switching the magnetic moments of the first and second films 208 and 210 in response to an external magnetic field without the exchange coupling field being strong enough to return the magnetic moments to their original position. After lapping, I have found that the cobalt (Co) first and second films 208 and 210 also have high stress induced anisotropy which may tend to rotate the magnetic moments of the first and second films 208 and 210 from their perpendicular positions to the ABS. Further, the cobalt (Co) of the first and second films 208 and 210 exhibits low resistance which causes an undesirable shunting of the sense current.

Figure 11:
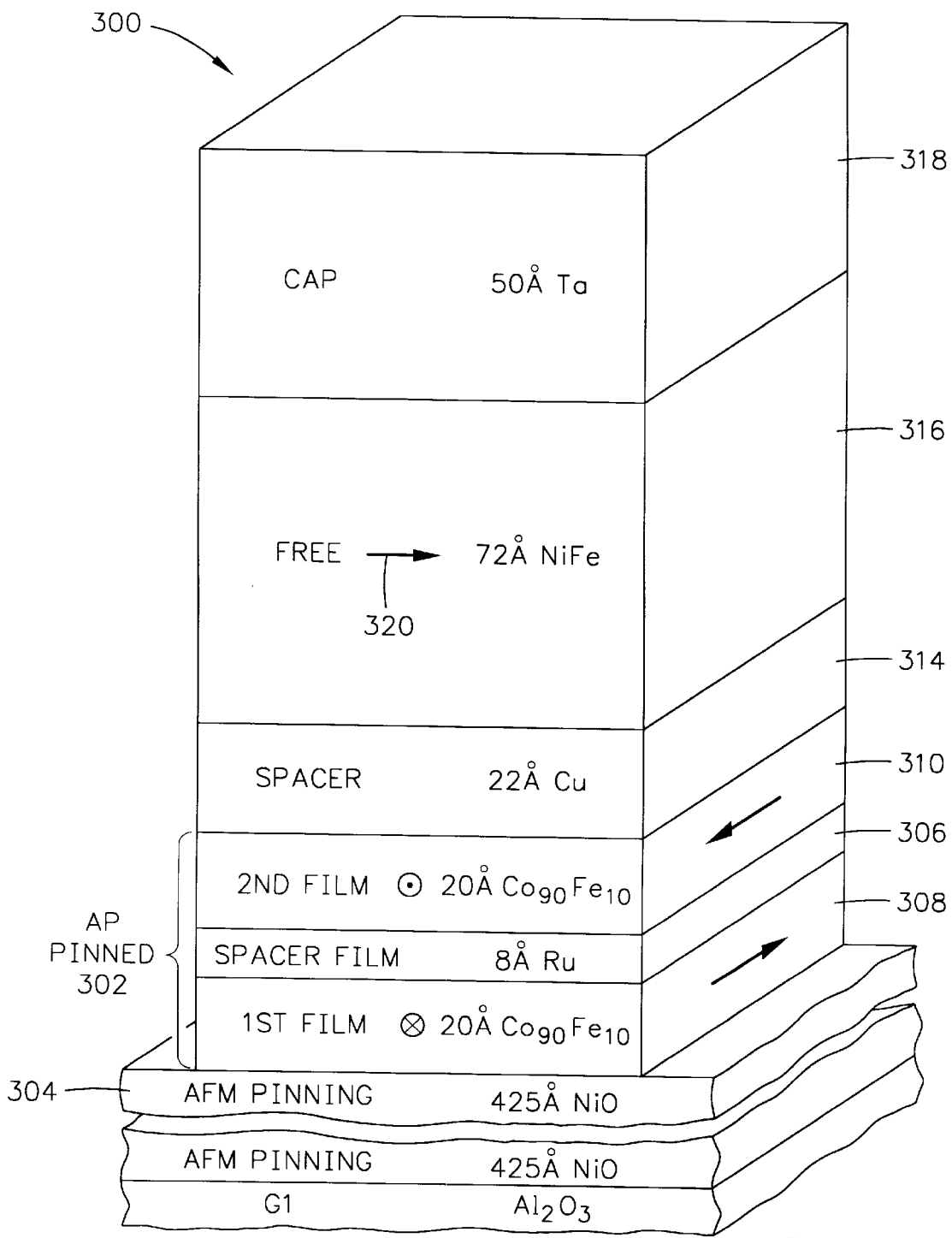
FIG. 11 is an isometric ABS illustration of a first embodiment of the present sensor.

FIG. 11 is a first embodiment of the present invention which is an improved AP pinned spin valve sensor 300. The spin valve sensor 300 includes an AP pinned layer 302 which is located on the AFM pinning layer 304. The AP pinned layer 302 includes an AP coupling film 306 which is located between first and second ferromagnetic films 308 and 310. This embodiment is improved by employing first and second films 308 and 310 that are made from cobalt iron ($Co_{90}Fe_{10}$) which will be discussed in more detail hereinafter. The AP coupling film 306 may be 8 Å of ruthenium (Ru), iridium (Ir) or rhodium (Rh) and each of the first and second films 308 and 310 may be 20 Å of cobalt iron ($Co_{90}Fe_{10}$). The first film 308 is exchange coupled to the AFM pinning layer 304 and, assuming its magnetic moment is pinned by the AFM pinning layer into the paper as shown by the circle with the x, the second film 310 will have a magnetic moment that is antiparallel and directed out of the paper as shown by the circle with the dot. I have found that in the embodiment 300 the interface film 212 in FIG. 10 can be eliminated since cobalt iron ($Co_{90}Fe_{10}$) has improved exchange coupling with the AFM pinning layer 304. A spacer layer 314 is located on the second film 310, the free layer 316 is located on the spacer film and the cap layer 318 is located on the free layer 316. The spacer layer may be 22 Å of copper (Cu), the free layer may be 72 Å of nickel iron (NiFe) and the cap layer may be 50 Å of tantalum (Ta). I have found that the cobalt iron ($Co_{90}Fe_{10}$) in the first and second films 308 and 310 provides the films with low coercivity, near zero magnetostriction and high resistance. The low coercivity enables the exchange coupling field to always return the magnetic moments of the first and second films 308 and 310 to their pinned positions should they be switched 180° by an external magnetic field. It is desired that the coercivity of the first and second films 308 and 310 be less than one-half the exchange coupling field. For instance, it would be desirable for the coercivity of the first and second films to be about 100 Oe when the exchange coupling field is about 300 Oe. The cobalt iron ($Co_{90}Fe_{10}$) satisfies this requirement. The sensor 300 in FIG. 11 is very stable to external fields. Further, the first and second films have near zero magnetostriction which means that there is near zero stress induced anisotropy. This ensures that the magnetic moments of the first and second films retain their positions perpendicular to the ABS. Further, the first and second films 308 and 310 have a high resistance so that the sense current is not shunted which shunting causes a decrease in the read signal.

Figure 12:
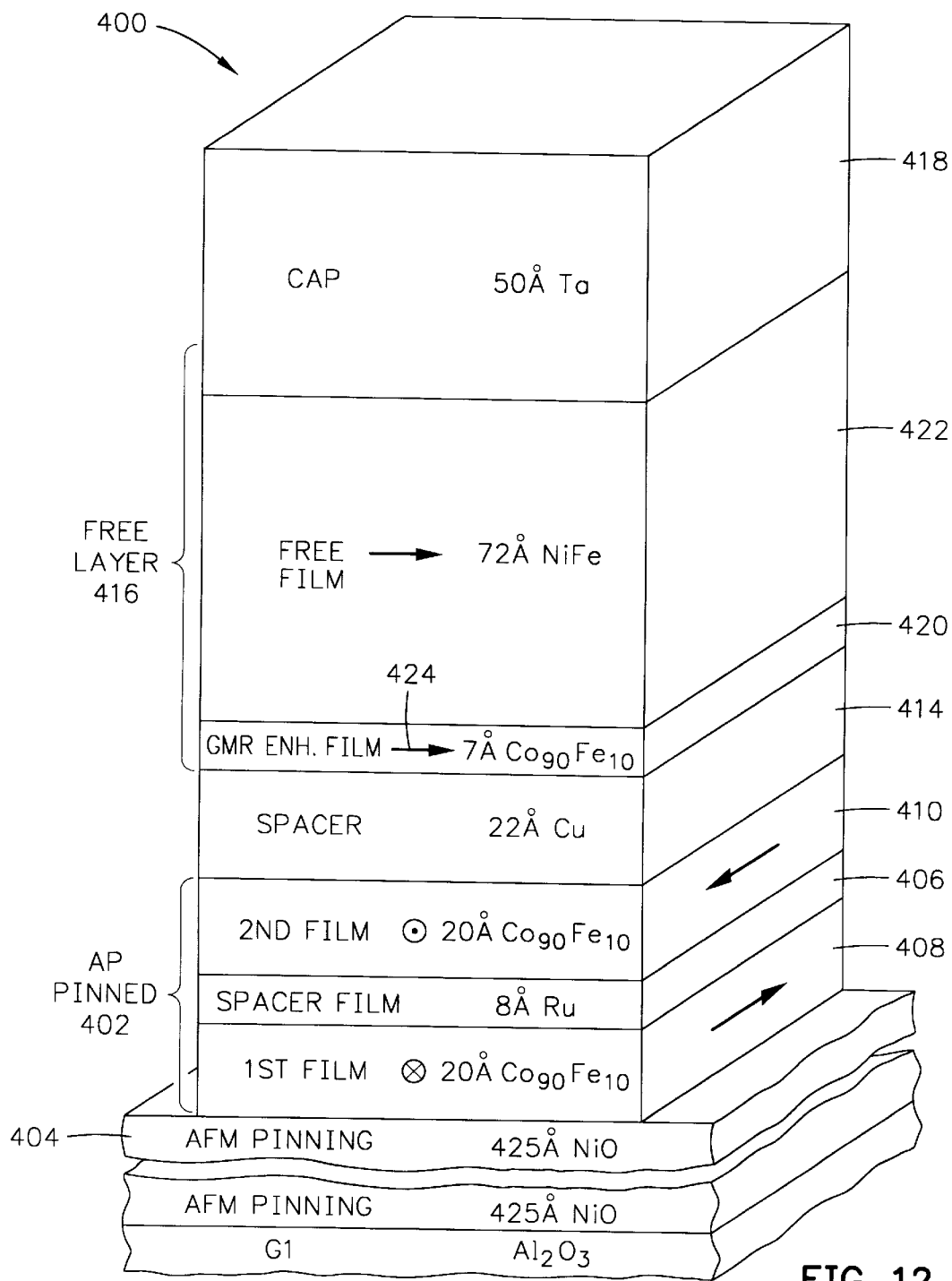
FIG. 12 is an isometric ABS illustration of a second embodiment of the present spin valve sensor.

A second embodiment 400 of the present invention is shown in FIG. 12 which is the same as the spin valve sensor 300 shown in FIG. 11, except the free layer 416 includes two films instead of one. The first film is a giant magnetoresistance (GMR) enhancing film 420 and the second film is a free film 422. The GMR enhancing film 420 is located between the spacer layer 414 with the free film 422 and significantly enhances the spin dependent scattering of conduction electrons at the interface of the spacer layer 414 with the GMR enhancing film 420. I have found that by making the GMR enhancing film 420 of cobalt iron ($Co_{90}Fe_{10}$) instead of cobalt that the coercivity of the film 420 is lower and that the stress induced anisotropy is near zero. The cobalt iron ($Co_{90}Fe_{10}$) makes the GMR enhancing film 320 a softer magnetic film than cobalt (Co). This ensures that the magnetic moment 424 of the GMR enhancing film 420 will rotate more easily in response to magnetic incursions from the rotating magnetic disk. Since the GMR enhancing film 420 has near zero stress induced anisotropy the magnetic domains of the GMR enhancing film 420 can be reliably stabilized by the longitudinal biasing of the hard bias layers 140 and 144 in FIG. 9.

Figure 13:
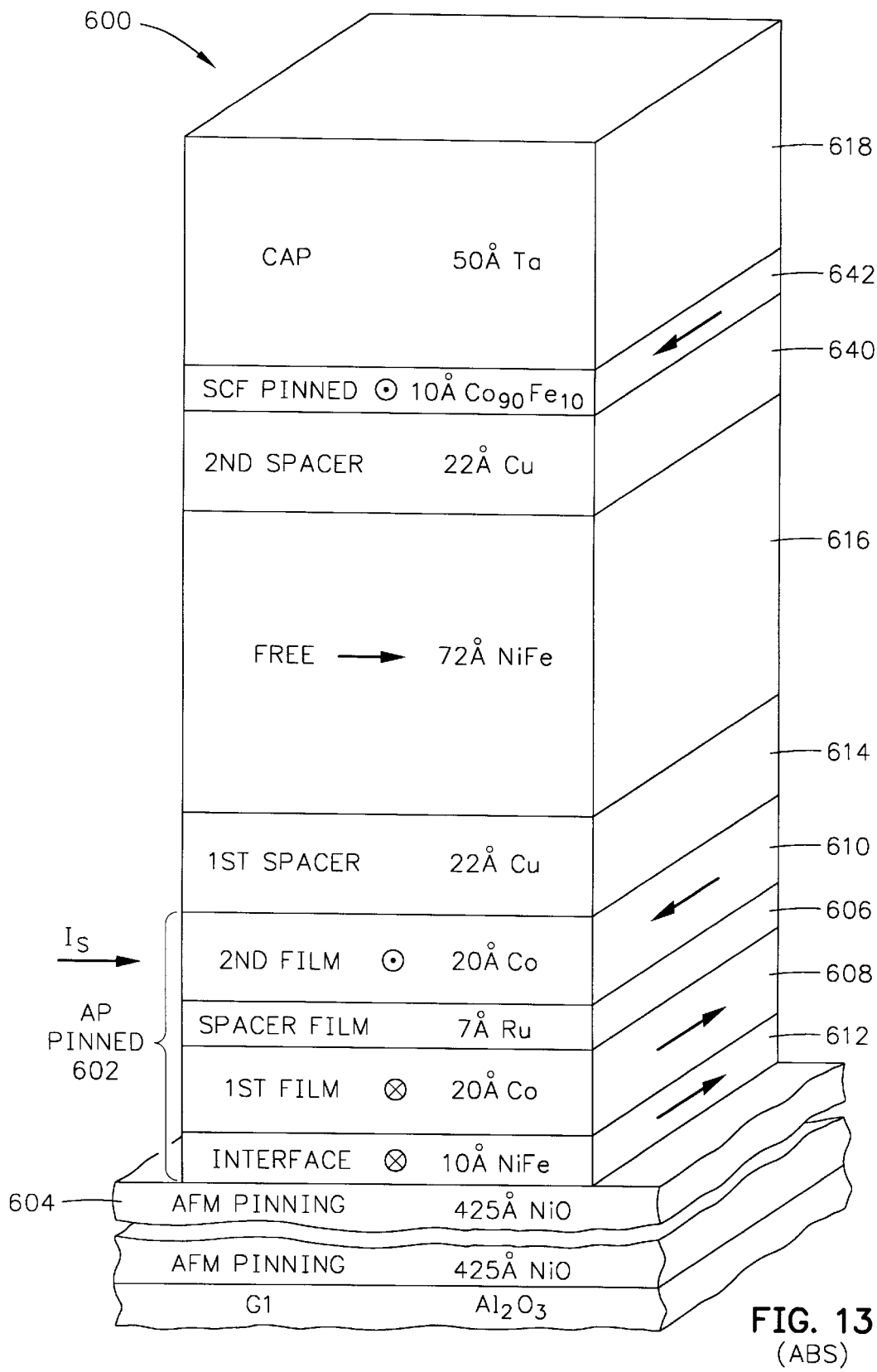
FIG. 13 is an isometric ABS illustration of a third embodiment of the present spin valve sensor.
Figure 14:
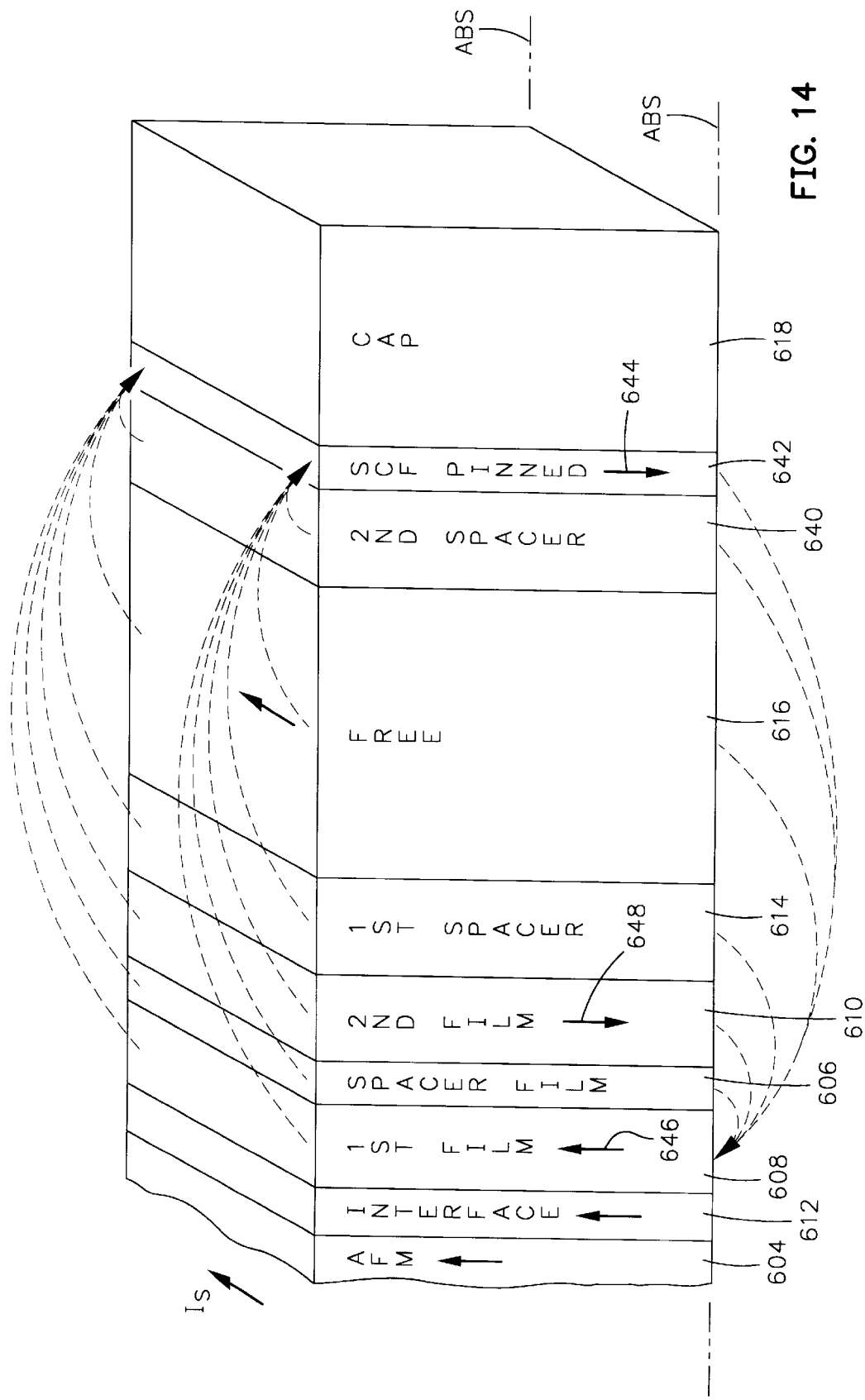
FIG. 14 is an isometric side view rotated 90° of the third embodiment of the present spin valve sensor shown in FIG. 13.

Still another embodiment 600 of the present spin valve sensor 600 is shown in FIG. 13 which is the same as the spin valve sensor 200 shown in FIG. 10 except a second spacer layer 640 and a sense current field (SCF) pinned layer 642 are employed. In this embodiment there are two pinned layers, namely the AP pinned layer 602 and the SCF pinned layer 642. The second spacer layer 640 may be 22 Å of copper (Cu) and the SCF pinned layer is constructed of cobalt iron ($Co_{90}Fe_{10}$) which may be 10 Å thick. It is required that the magnetic moment of the SCF pinned layer 642 be pinned in the same direction as the second film 610 of the AP pinned layer 602. When this occurs the spin dependent scattering of the conduction electrons at the interface of the SCF pinned layer 642 and the second spacer layer 640 are additive to the spin dependent scattering of the conduction electrons at the interface of the second film 610 and the first spacer layer 614. In order to direct the magnetic moment of the SCF pinned layer 642 in the proper direction the sense current $I_s$ must be in the appropriate direction. This is shown in FIG. 14 wherein, assuming that the sense current field $I_s$ is directed into the page, the sense current fields from the electrically conductive layers, other than the SCF pinned layer 642, exert sense current fields on the SCF pinned layer 642 causing its magnetic moment 644 to be directed downwardly. The sense current fields from the conductive layers also exert a force on the first film 608 causing its magnetic moment 646 to be directed upwardly. Because of the strong exchange coupling between the first and second films 608 and 610 the magnetic moment 648 of the second film will be directed downwardly. It should be noted that the sense current fields oppose the direction of the magnetic moment 648, however, the exchange coupling between the first and second films 608 and 610 is stronger than the sense current fields so that the magnetic moment 648 stays in the downward direction. The cobalt iron ($Co_{90}Fe_{10}$) of the SCF pinned layer 642 provides this layer with low coercivity, near zero magnetostriction and high resistance. The coercivity should be less than the sense current fields so that should the magnetic moment of the SCF pinned layer 642 be switched 180° from its original direction the sense current fields will return it to their original positions. The near zero magnetostriction ensures that stress induced anisotropy will not rotate the magnetic moment 644 from the position perpendicular to the ABS. The high resistance of the SCF pinned layer 642 ensures that a minimal amount of sense current field will be shunted.

Figure 15:
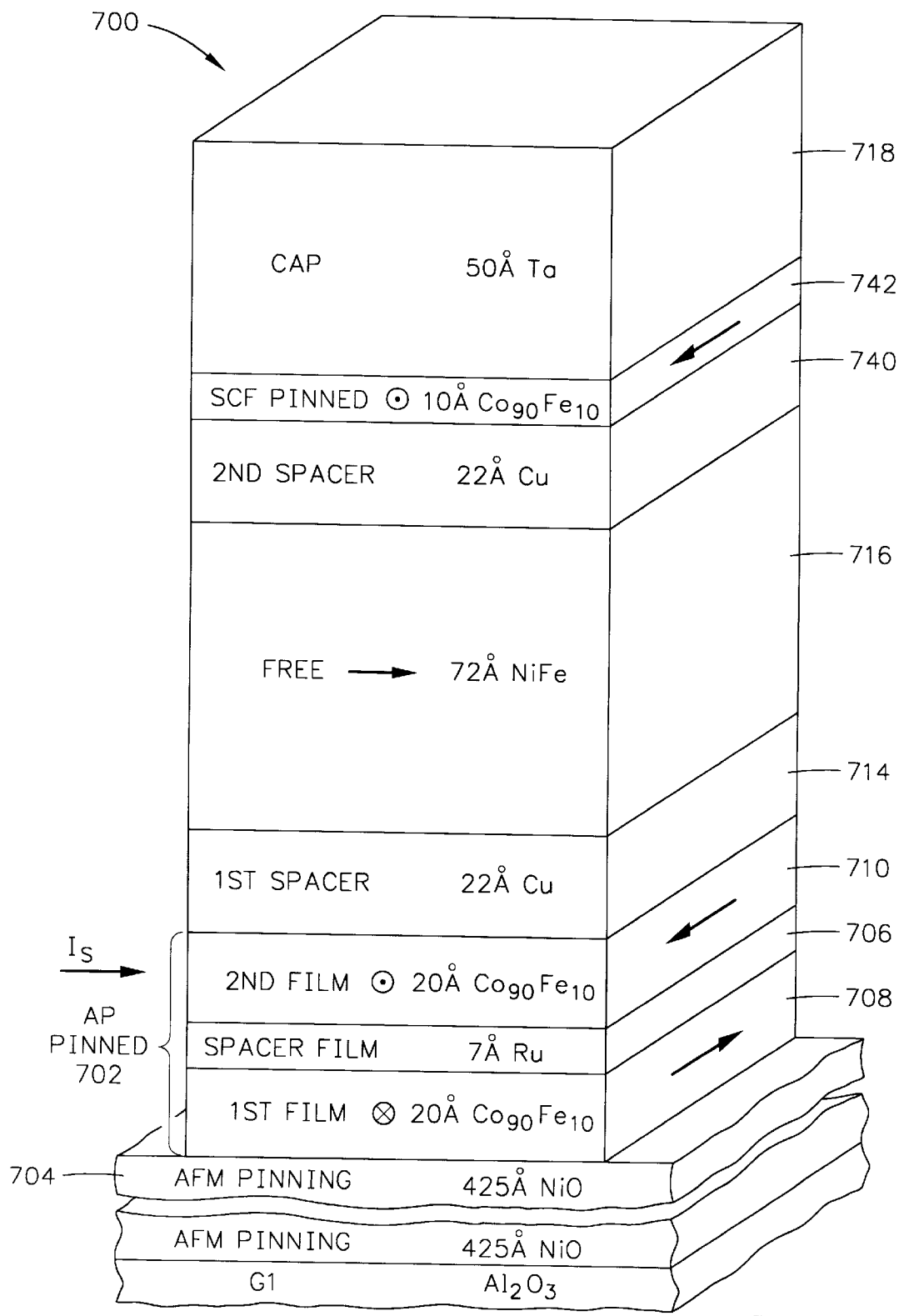
FIG. 15 is an isometric ABS illustration of a fourth embodiment of the present spin valve sensor.
Figure 16:
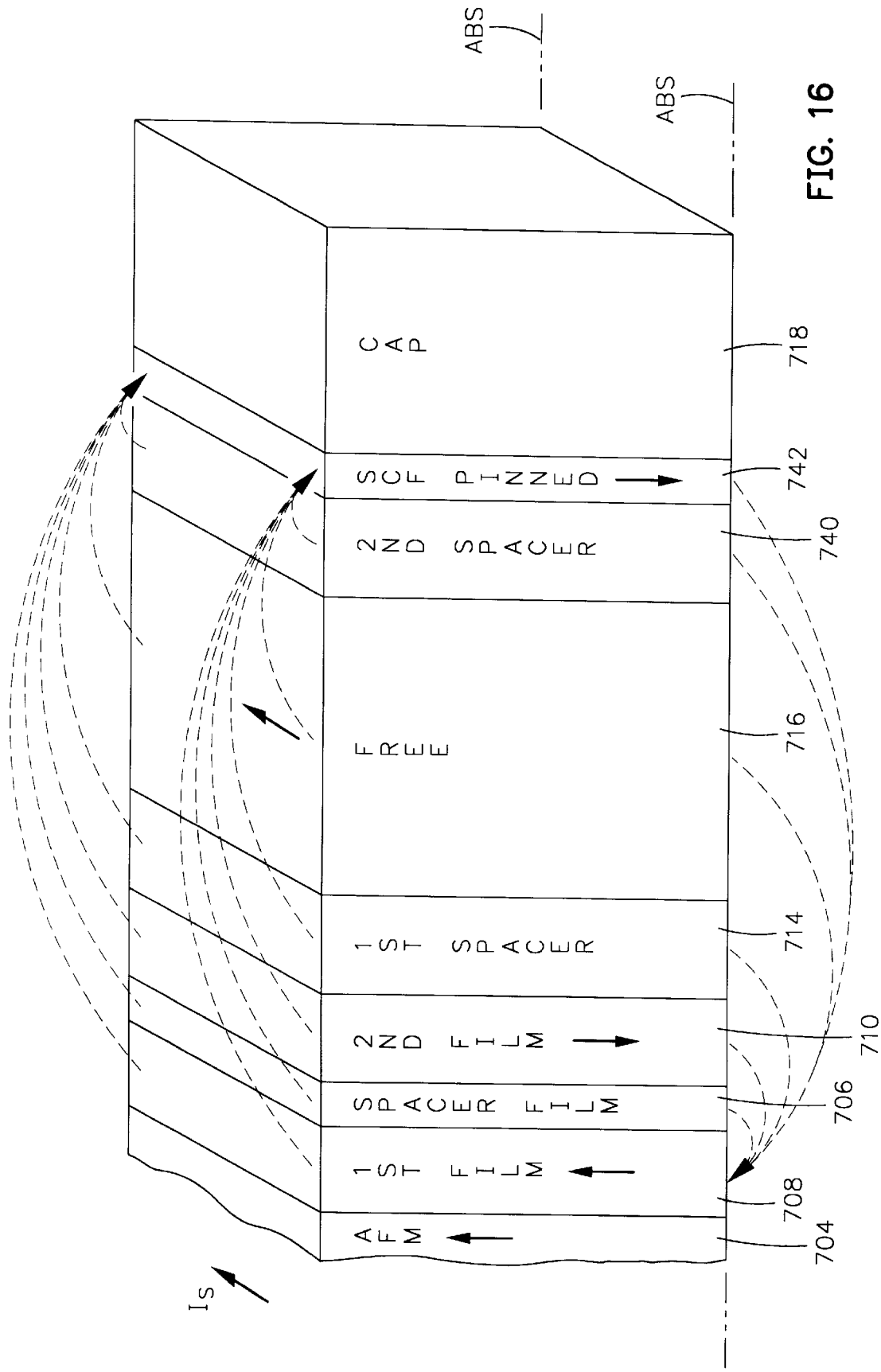
FIG. 16 is a side view rotated 90° of the fourth embodiment of the present invention as shown in FIG. 15.

Still another embodiment 700 of the present spin valve sensor is shown in FIG. 15 which is the same as the spin valve sensor 600 shown in FIG. 13 except the AP pinned layer 702 omits the interface layer 612 and makes the first and second films 708 and 710 of cobalt iron ($Co_{90}Fe_{10}$). The AP pinned layer 702 has the same advantages as the AP pinned layer 302 in FIG. 11 and the SCF pinned layer 742 has the same advantages as the SCF pinned layer 642 in FIG. 13. When the sense current field $I_s$ is directed as shown in FIG. 16 the SCF pinned layer 742 is directed in the proper direction for adding its spin valve effect to the spin valve effect of the AP pinned layer 702.

Figure 17:
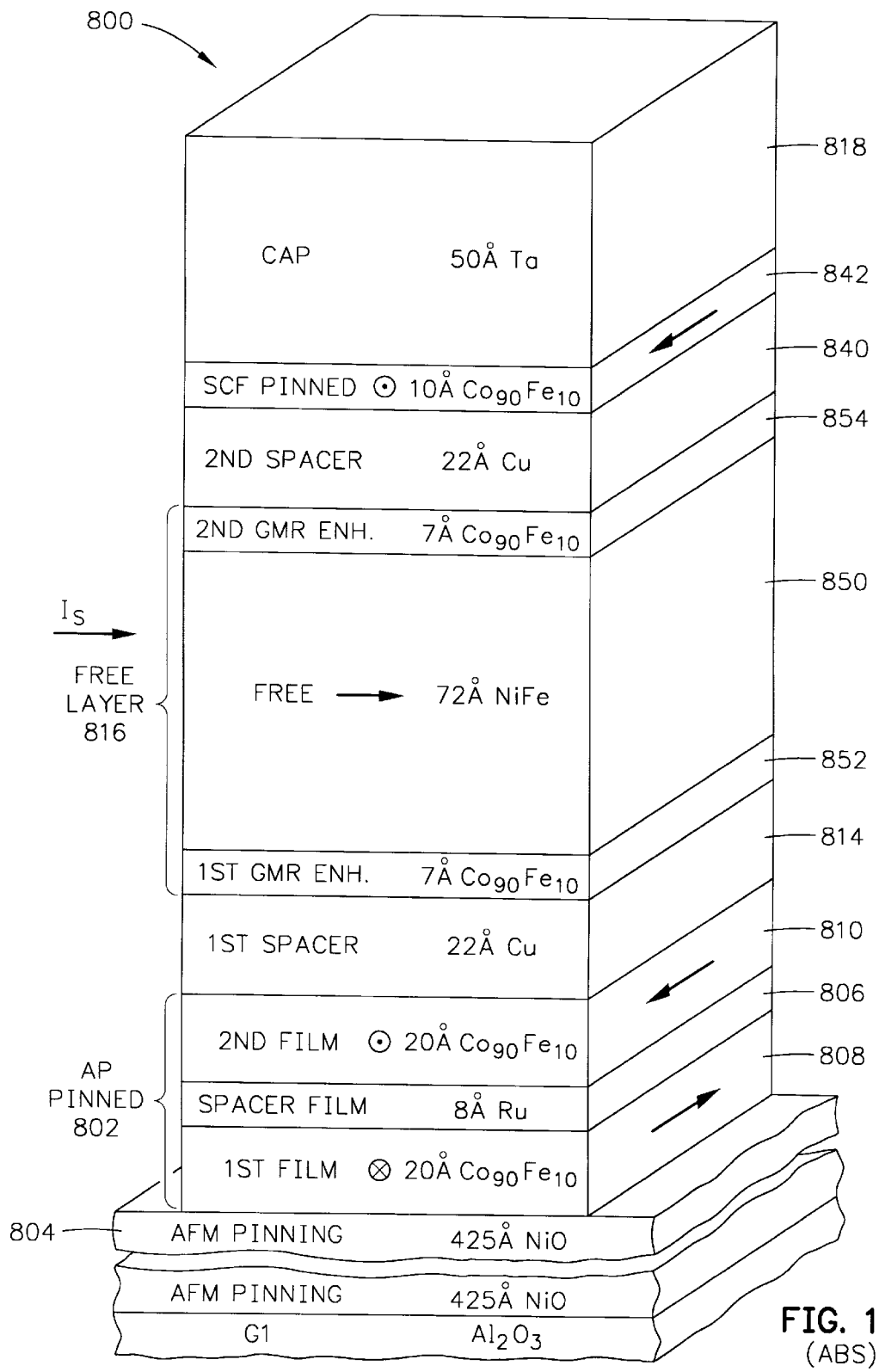
FIG. 17 is an isometric ABS illustration of a fifth embodiment of the present spin valve sensor.
Figure 18:
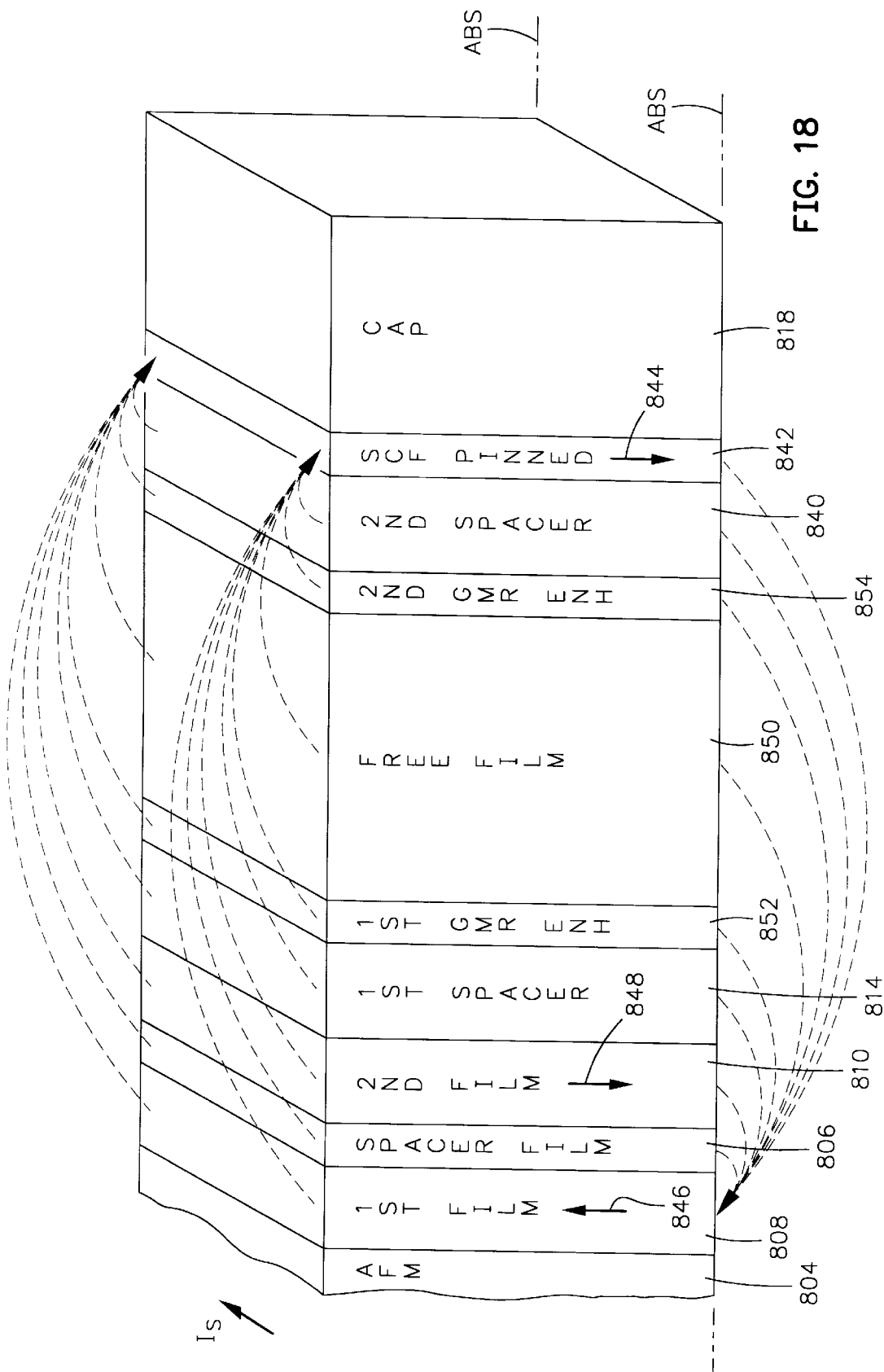
FIG. 18 is a side view rotated 90° of the sixth embodiment of the present spin valve sensor shown in FIG. 17.

Still another embodiment 800 of the present spin valve sensor is shown in FIG. 17 which is the same as the spin valve sensor 700 shown in FIG. 15 except the free layer 816 includes a free film 850 which is sandwiched between first and second GMR enhancing films 852 and 854. The first GMR enhancing film 852 enhances the spin dependent electron scattering at the interface of the first GMR enhancing layer 852 with the first spacer layer 814 and the second GMR enhancing layer 854 enhances the spin dependent scattering at the interface of the second GMR enhancing layer 854 with the second spacer layer 840. Both of the first and second GMR enhancing layers 852 and 854 are made of cobalt iron ($Co_{90}Fe_{10}$) and each of their thicknesses is preferably 7 Å. The second GMR enhancing layer 854 has the same advantages as described for the GMR enhancing film 420 in FIG. 12. Accordingly, the embodiment 800 in FIG. 17 has all of the advantages described for all of the previous embodiments. Spin dependent scattering is doubly enhanced by the first and second GMR enhancing layers 852 and 854 and the spin valve effect is doubled by the operation of the AP pinned layer 802 and the SCF pinned layer 842. Because of the use of cobalt iron ($Co_{90}Fe_{10}$) the magnetic layers are highly stable, have near zero magnetostriction and have high resistance. FIG. 18 shows the required sense current fields for establishing the direction of the magnetic moment 844 of the SCF pinned layer 842 in the same direction as the magnetic moment 848 of the second film 810 of the AP pinned layer.

It should be understood that the various thicknesses of the layers can vary from that as described hereinabove. Preferred ranges for the thicknesses of the layers are 375–475 Å for the AFM pinning layer 804 in FIG. 18, 15–30 Å for the first film 808, 6–10 Å for the AP coupling film 806, 15–30 Å for the second film 810, 18–30 Å for the first spacer film 814, 3–10 Å for the first GMR enhancing film 852, 30–100 Å for the free film 850, 3–10 Å for the second GMR enhancing film 854, 18–30 Å for the second spacer layer 840, 5–20 Å for the SCF pinned layer 842 and 25–100 Å for the cap layer 818. The preferred range for the interface layer 612 in FIG. 14 is 8–15 Å. It should be understood that the cobalt iron layers can have a different ratio than $Co_{90}Fe_{10}$. For instance, the cobalt may have a percentage range of 95% to 80% and the iron may have a percentage range of 5% to 20%. The other layers may be made from other suitable materials, as desired.

Clearly, other embodiments and modifications of this invention will readily occur to those of ordinary skill in the art upon reading these teachings. Therefore, this invention is to be limited only by the following claims, which include all such embodiments and modifications when viewed in conjunction with the above specification and accompanying drawings.

I claim:

1. A spin valve sensor comprising:

a ferromagnetic free layer;

a nonmagnetic electrically conductive first spacer layer;

an antiparallel (AP) pinned layer;

an antiferromagnetic pinning layer;

the AP pinned layer being exchange coupled to the pinning layer and the first spacer layer being located between the AP pinned layer and the free layer;

the AP pinned layer including first and second ferromagnetic films and an AP coupling film wherein the AP coupling film is sandwiched between the first and second ferromagnetic films; and at least one of the ferromagnetic films being $Co_{90}Fe_{10}$.

2. A spin valve sensor as claimed in claim 1 wherein each of the first and second ferromagnetic films is $Co_{90}Fe_{10}$.

3. A spin valve sensor as claimed in claim 2 including:

the free layer having a film of nickel iron (NiFe) and a third ferromagnetic film of $Co_{90}Fe_{10}$; and the third ferromagnetic film of $Co_{90}Fe_{10}$ interfacially engaging the first spacer layer.

4. A spin valve sensor as claimed in claim 2 including:

a nonmagnetic electrically conductive second spacer layer;

a sense current field (SCF) pinned layer;

the second spacer layer being sandwiched between the free layer and the SCF layer; and the SCF layer being $Co_{90}Fe_{10}$.

5. A spin valve sensor as claimed in claim 4 including:

the free layer having a film of nickel iron (NiFe) and a third ferromagnetic film of $Co_{90}Fe_{10}$; and the third ferromagnetic film of $Co_{90}Fe_{10}$ interfacially engaging the first spacer layer.

6. A spin valve sensor comprising:

a ferromagnetic free layer;

a nonmagnetic electrically conductive first spacer layer;

an antiparallel (AP) pinned layer;

an antiferromagnetic pinning layer;

the AP pinned layer being exchange coupled to the pinning layer and the first spacer layer being located between the AP pinned layer and the free layer;

the AP pinned layer including first and second ferromagnetic films and an AP coupling film wherein the AP coupling film is sandwiched between the first and second ferromagnetic films;

a nonmagnetic electrically conductive second spacer layer;

a sense current field (SCF) pinned layer;

the second spacer layer being sandwiched between the free layer and the SCF layer; and the SCF pinned layer being $Co_{90}Fe_{10}$.

7. A spin valve sensor comprising:

a ferromagnetic free layer;

a nonmagnetic electrically conductive first spacer layer;

an antiparallel (AP) pinned layer;

an antiferromagnetic pinning layer;

the AP pinned layer being exchange coupled to the pinning layer and the first spacer layer being located between the AP pinned layer and the free layer;

the AP pinned layer including first and second ferromagnetic films and an AP coupling film wherein the AP coupling film is sandwiched between the first and second ferromagnetic films; and each of the first and second ferromagnetic films being $Co_{90}Fe_{10}$ a nonmagnetic electrically conductive second spacer layer;

a sense current field (SCF) pinned layer;

the second spacer layer being sandwiched between the free layer and the SCF layer; and the SCF layer being $Co_{90}Fe_{10}$;

the free layer having a film of nickel iron (NiFe) and a third and fourth ferromagnetic films of $Co_{90}Fe_{10}$ with the film of nickel iron (NiFe) being sandwiched between the third and fourth ferromagnetic films of $Co_{90}Fe_{10}$;

the third ferromagnetic film of $Co_{90}Fe_{10}$ interfacially engaging the first spacer layer and the fourth ferromagnetic film of $Co_{90}Fe_{10}$ interfacially engaging the second spacer layer.

8. A magnetic head that has an air bearing surface (ABS) comprising:

a read head that includes:

first and second ferromagnetic shield layers:

first and second nonmagnetic electrically insulative gap layers located between the first and second ferromagnetic shield layers;

a spin valve sensor responsive to applied magnetic fields;

the spin valve sensor being located between the first and second gap layers; and first and second electrically conductive lead layers located between the first and second gap layers and connected to the spin valve sensor for conducting a sense current through the spin valve sensor;

the spin valve sensor including:

a pinning layer that has magnetic spins oriented in a first predetermined direction that is perpendicular to the ABS;

an antiparallel (AP) pinned layer exchange coupled to the pinning layer so that a magnetic moment of the AP pinned layer is pinned in a second predetermined direction that is antiparallel to said first predetermined direction;

the AP pinned layer including first and second ferromagnetic films and an AP coupling film wherein the AP coupling film is sandwiched between the first and second ferromagnetic films; and each of the first and second ferromagnetic films being $Co_{90}Fe_{10}$;

a free layer that has a magnetic moment that is free to rotate relative to the second predetermined direction of the AP pinned layer in response to an applied field;

a nonmagnetic electrically conductive first spacer layer;

the first spacer layer being located between the free layer and the AP pinned layer.

9. A magnetic head as claimed in claim 8 including:

the free layer having a film of nickel iron (NiFe) and a third ferromagnetic film of $Co_{90}Fe_{10}$; and the third ferromagnetic film of $Co_{90}Fe_{10}$ interfacially engaging the first spacer layer.

10. A magnetic head as claimed in claim 9 including:

the free layer having a fourth ferromagnetic film of $Co_{90}Fe_{10}$ wherein the film of nickel iron (NiFe) is sandwiched between the third and fourth films of $Co_{90}Fe_{10}$;

the fourth film of $Co_9Fe_{10}$ interfacially engaging the second spacer layer.

11. A magnetic head as claimed in claim 8 further including:
a sense current field (SCF) pinned layer that has a magnetic moment that can be pinned in a direction parallel to said second predetermined direction by a sense current field from other conductive layers of the spin valve sensor;
a nonmagnetic electrically conductive second spacer layer that is located between the free layer and the SCF pinned layer; and
the SCF pinned layer being $Co_{90}Fe_{10}$.

12. A magnetic head as claimed in claim 11 including:
the free layer having a film of nickel iron (NiFe) and a third ferromagnetic film of $Co_{90}Fe_{10}$; and
the third ferromagnetic film of $Co_{90}Fe_{10}$ interfacially engaging the first spacer layer.

13. A magnetic head as claimed in claim 12 including:
the free layer having a fourth ferromagnetic film of $Co_{90}Fe_{10}$ wherein the film of nickel iron (NiFe) is sandwiched between the third and fourth films of $Co_{90}Fe_{10}$;
the fourth film of $Co_{90}Fe_{10}$ interfacially engaging the second spacer layer.

14. A magnetic head as claimed in claim 8 further including:
a write head including:
first and second pole piece layers and a write gap layer;
the first and second pole piece layers being separated by the write gap layer at the ABS and connected at a back gap that is recessed rearwardly in the head from the ABS;
an insulation stack having at least first and second insulation layers;
at least one coil layer embedded in the insulation stack; and
the insulation stack and the at least one coil layer being located between the first and second pole piece layers.

15. A magnetic head as claimed in claim 14 including:
a sense current field (SCF) pinned layer that has a magnetic moment that can be pinned in a direction parallel to said second predetermined direction by a sense current field from other conductive layers of the spin valve sensor;
a nonmagnetic electrically conductive second spacer layer that is located between the free layer and the SCF pinned layer; and
the SCF pinned layer being $Co_{90}Fe_{10}$.

16. A magnetic head as claimed in claim 15 including:
the free layer having a film of nickel iron (NiFe) and a third ferromagnetic film of $Co_{90}Fe_{10}$; and
the third ferromagnetic film of $Co_{90}Fe_{10}$ interfacially engaging the first spacer layer.

17. A magnetic head as claimed in claim 16 including:
the free layer having a fourth ferromagnetic film of $Co_{90}Fe_{10}$ wherein the film of nickel iron (NiFe) is sandwiched between the third and fourth films of $Co_{90}Fe_{10}$;
the fourth film of $Co_{90}Fe_{10}$ interfacially engaging the second spacer layer.

18. A magnetic disk drive that includes at least one magnetic head that has an air bearing surface (ABS), the disk drive comprising:
the magnetic head including a combined read head and write head;
a read head that includes:
first and second ferromagnetic shield layers:
first and second nonmagnetic electrically insulative gap layers located between the first and second ferromagnetic shield layers;
a spin valve sensor responsive to applied magnetic fields;
the spin valve sensor being located between the first and second gap layers; and
first and second electrically conductive lead layers located between the first and second gap layers and connected to the spin valve sensor for conducting a sense current through the spin valve sensor;
the spin valve sensor including:
a pinning layer that has magnetic spins oriented in a first predetermined direction that is perpendicular to the ABS;
an antiparallel (AP) pinned layer exchange coupled to the pinning layer so that a magnetic moment of the AP pinned layer is pinned in a second predetermined direction that is antiparallel to said first predetermined direction;
the AP pinned layer including first and second ferromagnetic films and an AP coupling film wherein the AP coupling film is sandwiched between the first and second ferromagnetic films; and
each of the first and second ferromagnetic films being $Co_{90}Fe_{10}$;
a free layer that has a magnetic moment that is free to rotate relative to the second predetermined direction of the AP pinned layer in response to an applied field;
a nonmagnetic electrically conductive first spacer layer;
the first spacer layer being located between the free layer and the AP pinned layer;
the write head including:
first and second pole piece layers and a write gap layer;
the first and second pole piece layers being separated by the write gap layer at the ABS and connected at a back gap that is recessed rearwardly in the head from the ABS;
an insulation stack having at least first and second insulation layers;
at least one coil layer embedded in the insulation stack; and
the insulation stack and the at least one coil layer being located between the first and second pole piece layers;
the second shield layer and the first pole piece layer being a common layer;
a housing;
a magnetic disk rotatably supported in the housing;
a support mounted in the housing for supporting the magnetic head with its ABS facing the magnetic disk so that the magnetic head is in a transducing relationship with the magnetic disk;
means for rotating the magnetic disk;
positioning means connected to the support for moving the magnetic head to multiple positions with respect to said magnetic disk; and
processing means connected to the magnetic head, to the means for rotating the magnetic disk and to the positioning means for exchanging signals with the merged magnetic head, for controlling movement of the magnetic disk and for controlling the position of the magnetic head.

19. A magnetic disk drive as claimed in claim 18 including:
- a sense current field (SCF) pinned layer that has a magnetic moment that can be pinned in a direction parallel to said second predetermined direction by a sense current field from other conductive layers of the spin valve sensor;
- a nonmagnetic electrically conductive second spacer layer that is located between the free layer and the SCF pinned layer; and
- the SCF pinned layer being $Co_{90}Fe_{10}$.

20. A magnetic disk drive as claimed in claim 19 wherein the processing means is connected to the first and second leads for applying the sense current to the sensor in a direction that causes conductive layers of the sensor to apply sense current fields to the antiparallel pinned layer that are directed in said first predetermined direction and sense current fields to the SCF pinned layer that are directed in said second predetermined direction.

21. A magnetic disk drive as claimed in claim 20 wherein the processing means applies said sense current.

22. A magnetic disk drive as claimed in claim 18 further including:
- the free layer having a film of nickel iron (NiFe) and a third ferromagnetic film of $Co_{90}Fe_{10}$; and
- the third ferromagnetic film of $Co_{90}Fe_{10}$ interfacially engaging the first spacer layer.

23. A magnetic disk drive as claimed in claim 22 including:
- the free layer having a fourth ferromagnetic film of $Co_{90}Fe_{10}$ wherein the film of nickel iron (NiFe) is sandwiched between the third and fourth films of $Co_{90}Fe_{10}$;
- the fourth film of $Co_{90}Fe_{10}$ interfacially engaging the second spacer layer.

24. A magnetic disk drive as claimed in claim 23 including:
- a sense current field (SCF) pinned layer that has a magnetic moment that can be pinned in a direction parallel to said second predetermined direction by a sense current field from other conductive layers of the spin valve sensor;
- a nonmagnetic electrically conductive second spacer layer that is located between the free layer and the SCF pinned layer; and
- the SCF pinned layer being $Co_{90}Fe_{10}$.

25. A magnetic disk drive as claimed in claim 24 wherein the processing means is connected to the first and second leads for applying the sense current to the sensor in a direction that causes conductive layers of the sensor to apply sense current fields to the antiparallel pinned layer that are directed in said first predetermined direction and sense current fields to the SCF pinned layer that are directed in said second predetermined direction.

26. A magnetic disk drive as claimed in claim 25 wherein the processing means applies said sense current.

* * * * *